(12) United States Patent
Fischer et al.

(10) Patent No.: US 9,477,639 B2
(45) Date of Patent: Oct. 25, 2016

(54) SAFE DRIVING MONITORING SYSTEM

(71) Applicant: Speed Demon Inc., Lunenburg, MA (US)

(72) Inventors: Richard W. Fischer, Lunenburg, MA (US); Jonathan R. Fischer, Lunenberg, MA (US); William A. Ricaurte, Sterling, VA (US)

(73) Assignee: Speed Demon Inc., Lunenburg, MA (US)

( * ) Notice: Subject to any disclaimer, the term of this patent is extended or adjusted under 35 U.S.C. 154(b) by 221 days.

(21) Appl. No.: 13/848,230

(22) Filed: Mar. 21, 2013

(65) Prior Publication Data
US 2013/0297097 A1 Nov. 7, 2013

Related U.S. Application Data

(63) Continuation-in-part of application No. 11/370,651, filed on Mar. 8, 2006, now Pat. No. 8,731,770.

(60) Provisional application No. 61/613,690, filed on Mar. 21, 2012.

(51) Int. Cl.
| | |
|---|---|
| *G07C 5/00* | (2006.01) |
| *G06F 17/00* | (2006.01) |
| *G06F 17/30* | (2006.01) |
| *G01C 21/26* | (2006.01) |
| *G01P 1/12* | (2006.01) |
| *G01P 1/14* | (2006.01) |

(Continued)

(52) U.S. Cl.
CPC ............... *G06F 17/00* (2013.01); *G01C 21/26* (2013.01); *G01P 1/122* (2013.01); *G01P 1/14* (2013.01); *G06F 17/30705* (2013.01); *G07C 5/085* (2013.01); *G08G 1/0962* (2013.01); *G08G 1/205* (2013.01); *G07C 5/008* (2013.01)

(58) Field of Classification Search
CPC . G06F 17/00; G06F 17/30705; G01C 21/26; G01P 1/122; G08G 1/205; G08G 1/0962; G07C 5/085; G07C 5/008; G06Q 10/00
USPC ......... 340/438, 439; 701/1, 29.1, 33.2, 33.4, 701/36, 70, 93, 400, 408, 409, 430, 461, 701/463; 707/737, 748
See application file for complete search history.

(56) References Cited

U.S. PATENT DOCUMENTS

| | | |
|---|---|---|
| 4,843,578 A | 6/1989 | Wade |
| 6,556,905 B1 | 4/2003 | Mittelsteadt et al. |

(Continued)

*Primary Examiner* — Stephen Holwerda
(74) *Attorney, Agent, or Firm* — Chapin Intellectual Property Law, LLC

(57) ABSTRACT

A method and system for detecting unsafe or suspect activities such as distracted driving associates distracted driving events to the road type, vehicle speed and vehicle acceleration (positive, negative and lateral) at the time of the distracted driving event, and identifies severe distracted driving events from a large population of minor events using a statistical distribution such as a Cauchy distribution equation. The system employs a smartphone application (App) coupled with a central server that computes driver safety scores which relate time of day, road type, vehicle speed, vehicle acceleration (positive, negative and lateral) and distracted driving using the Cauchy distribution equation. The server renders summary and detail reports of driving scores and distracted driving events to concerned parties including insurance companies, fleet managers, vehicle owners and the parents/guardians of teenaged drivers.

20 Claims, 13 Drawing Sheets

(51) Int. Cl.
 G08G 1/0962 (2006.01)
 G07C 5/08 (2006.01)
 G08G 1/00 (2006.01)

(56) References Cited

U.S. PATENT DOCUMENTS

| | | | |
|---|---|---|---|
| 6,701,234 B1 | 3/2004 | Vogelsang | |
| 7,356,392 B2 | 4/2008 | Hubbard et al. | |
| 2001/0018628 A1* | 8/2001 | Jenkins | G08G 1/127 701/33.4 |
| 2002/0091473 A1* | 7/2002 | Gardner | G07C 5/0808 701/32.7 |
| 2003/0058083 A1 | 3/2003 | Birchfield | |
| 2004/0153362 A1* | 8/2004 | Bauer | G06Q 40/02 705/4 |
| 2005/0137757 A1 | 6/2005 | Phelan et al. | |
| 2007/0027583 A1* | 2/2007 | Tamir | G06Q 30/0283 701/1 |
| 2008/0221776 A1 | 9/2008 | McClellan | |
| 2008/0319602 A1* | 12/2008 | McClellan | G07C 5/008 701/31.4 |
| 2011/0195699 A1* | 8/2011 | Tadayon | H04B 5/0062 455/418 |

* cited by examiner

| Speed Over Threshold | Road Type 1 | Road Type 2 | Road Type 3 |
|---|---|---|---|
| 0 | 100.0 | 100.0 | 100.0 |
| 5 | 86.7 | 81.8 | 27.8 |
| 10 | 26.5 | 19.2 | 13.6 |
| 15 | 18.4 | 10.0 | 3.8 |
| 20 | 11.9 | 2.9 | -3.3 |
| 25 | 6.5 | -2.6 | -8.8 |
| 30 | 2.0 | -7.1 | -13.2 |
| 35 | -1.9 | -10.9 | -16.7 |
| 40 | -5.2 | -14.0 | -19.6 |
| 45 | -8.1 | -16.7 | -22.0 |
| 50 | -10.6 | -19.0 | -24.1 |
| 55 | -12.9 | -21.0 | -25.9 |
| 60 | -14.9 | -22.7 | -27.4 |
| 65 | -16.7 | -24.3 | -28.8 |
| 70 | -18.3 | -25.7 | -30.0 |
| 75 | -19.8 | -26.9 | -31.1 |
| 450 | 451 | 452 | 453 |
| | | | |
| Threshold | | | |
| 32.5 | Road Type 1 | | |
| 22.5 | Road Type 2 | | |
| 17.5 | Road Type 3 | | |
| | 475 | | |

*FIG. 4D*

| 122' → | 190 → Posted on portal | 192 → Sent to contacts list | 194 → | 196 → Description |
|---|---|---|---|---|
| Driving related messages | | | | |
| High speed alarm | Yes | Yes | | Phone has traveled above the high speed setting |
| High speed warning | Yes | No | | Phone has traveled above the high speed setting |
| Secondary road speed alarm | Yes | Yes | | Phone has traveled above the secondary speed setting |
| Secondary road speed warning | Yes | No | | Phone has traveled above the secondary speed setting |
| Local road speed alarm | Yes | Yes | | Phone has traveled above the local speed setting |
| Local road speed warning | Yes | No | | Phone has traveled above the local speed setting |
| Check in | Yes | Yes | | Your teen has pressed the Check In button on the phone |
| SpeedOK | Yes | Yes | | Phone has responded to a Checkspeed request and no speeding was detected |
| GPS Accuracy too low | Yes | Yes | | Phone has responded to a Checkspeed request but cannot get an accurate location from the phone's GPS |
| Locate response | Yes | Yes | | A locate request has been received and responded to |
| Emergency track | Yes | No | | Emergency tracking has been started |
| Help Request | Yes | Yes | | The "Request Help" button on the phone has been pressed and emergency tracking has been started |
| GPS on / off | Yes | Yes | | The phone GPS has been turned on or off by the user. No speed monitoring can occur when GPS is off. When GPS is off, emergency tracking, request help, and locate messages are sent with the last known location if it is available. |

| System related messages | Note: To preserve privacy, location information is not sent with system messages | | |
|---|---|---|---|
| Battery OK | Yes | No | The battery level is above 50% |
| Battery low | Yes | No | The battery level is below 50% and the speed sampling frequency has been reduced to 5 minute intervals |
| Battery critical | Yes | No | The battery level is below 20% and speed sampling has been disabled. Request help, locate and emergency tracking are still available |
| App. start / stop | Yes | No | The phone has powered down or Speedbump has been stopped by the user, no speed monitoring can occur when Speedbump is stopped. Speedbump starts automatically when the phone is powered on. |
| System OK | Yes | No | Speedbump has sent it's daily system status message |
| System malfunction | Yes | Yes | Speedbump has not sent it's daily system status message and is not operating correctly. No speed monitoring, locate or emergency tracking can occur. |
| Daily summary report | Yes | Yes (to contacts for daily summary) | All activity for the previous day is listed |

*FIG. 6B-2*

SAFE DRIVING MONITORING SYSTEM

RELATED APPLICATIONS

This patent application is a continuation-in-part (CIP) under 35 U.S.C. §120 of U.S. patent application Ser. No. 11/370,651, Filed Mar. 8, 2006, entitled "METHOD AND APPARATUS FOR DETERMINING AND STORING EXCESSIVE VEHICLE SPEED," and claims the benefit under 35 U.S.C. §119(e) of U.S. Provisional Patent App. No. 61/613,690, filed Mar. 21, 2012, entitled "MONITORING AND REPORTING OF DISTRACTED DRIVING EVENTS," both incorporated herein by reference in entirety.

BACKGROUND

Modern proliferation of smaller personal electronic devices, as well as increasing bandwidth and connectivity, allows usage and enjoyment of such devices in an increasing number of locations. Combined with seemingly endless availability of consumer commodities such as food and beverage offerings available for take-out and drive-thru, contributes to a plethora of potential driving distractions, particularly for novice drivers. Media attention has also heightened as an increasing number of driving mishaps are traced to distracted driving, often resulting from usage of personal electronic devices.

Distracted driving includes any activity that could divert a person's attention away from the primary task of driving. All distractions endanger driver, passenger, and bystander safety. In particular, however, because text messaging, email usage and web browsing require visual, manual, and cognitive attention from the driver, they are by far the most alarming distractions. This problem exists for all types of driver: professional fleet drivers, non-commercial drivers who use a company vehicle for business, drivers of their own private vehicles, inexperienced drivers and teenaged drivers.

SUMMARY

A method and system for detecting unsafe or suspect activities such as distracted driving associates distracted driving events to the road type, vehicle speed and vehicle acceleration (positive, negative and lateral) at the time of the distracted driving event, and identifies severe distracted driving events from a large population of minor events using a statistical distribution such as a Cauchy distribution equation. The system employs a smartphone application (App) coupled with a central server that computes driver safety scores which relate time of day, road type, vehicle speed, vehicle acceleration (positive, negative and lateral) and distracted driving using the Cauchy distribution equation. The server renders summary and detail reports of driving scores and distracted driving events to concerned parties including insurance companies, fleet managers, vehicle owners and the parents/guardians of teenaged drivers.

Configurations herein are based, in part, on the observation that conventional approaches to driving assessment focus on individual events and preventing or tracking such specific events, such as preventing use of certain apps (i.e. texting) or exceeding a pre-set speed limit (i.e. 85 mph). Unfortunately, such conventional approaches fail to consider an overall performance of a monitored driver that considers positive and negative factors over an extended time period to assess a level of care. Accordingly, configurations herein substantially overcome the above described shortcomings by determining an aggregate score of a driving session by accumulating a number of factors related to distracted, inattentive, and/or risky driving behavior, and computing a conclusive summation of results, rather than an unrelated set of specific events. A driving score includes measurement of abrupt actions (starting, stopping), sudden movements (angular velocity indicative of hard cornering), vehicle speed over a range of different road types, and usage of particular applications (apps) on a personal device.

Personal electronic devices such cellphones, smartphones, tablets and the like are often carried as commonly as keys, wallet or purse. The driving monitoring system as disclosed herein takes the form of a downloadable app which launches and executes on the personal device and communicates with a central server for reporting driving activity, particularly suspect activities which may indicate a potentially risky or dangerous behavior. In particular, the app monitors the use of other apps which may be considered to distract the driver from attention to the road, and motion parameters such as speed and angular velocity which indicate physical driving patterns considered to be associated with inattentive, risky, or distracted behavior.

Events gathered by the app are communicated to a server for coalescing with other raw event data of other drivers, and computing reports of driving habits as well as a score which is normalized with scores of other drivers to provide an objective assessment of driving. A statistical distribution such as a Cauchy distribution measures a severity of an event, and may emphasize a significant deviation as a separate notification. For example, a 5-10 mph (miles per hour) speed limit transgression is not as serious as a 90 mph traveling speed. Reports and individual events are reported to a supervisory or ownership entity such as a parent or employer. Further, verification of app operation is verified so that a driver may not avoid scrutiny by disabling the app or powering down the personal device.

In an example configuration discussed below, the disclosed method for tracking driving habits includes associating a personal device with a driver in a vehicle, determining that the driver is engaging in a suspect activity while driving, comparing the suspect activity with a severity scale indicative of a relative risk of the activity, computing a score based on the comparison and reporting the determined suspect activity and the score to a repository for accumulating a driving history of the driver. The method may include more specific operations depending on the type of suspect event. For example, the method for tracking driving events may include determining, via a personal device associated with a driver in a vehicle, a speed of the vehicle based on relative positioning of the personal device, and receiving a user defined speed threshold corresponding to a road type determined from the position of the vehicle, in which the threshold is defined for the road type. The method compares the speed to the received threshold and reports the determined speed and the road type if the determined speed exceeds the threshold corresponding to the road type currently being traveled.

An environment for operation of the system and method disclosed herein includes a server for aggregating and reporting distracted driving events comprising, a repository for storing suspect events received from personal devices corresponding to a plurality of monitored drivers, an access connection from the server to a personal device of each of the plurality of monitored drivers, and scoring logic for receiving the suspect events from the personal devices and computing a score indicative of safe driving habits exhibited by the monitored drivers.

Alternate configurations of the invention include a multiprogramming or multiprocessing computerized device such as a multiprocessor, controller or dedicated computing device or the like configured with software and/or circuitry (e.g., a processor as summarized above) to process any or all of the method operations disclosed herein as embodiments of the invention. Still other embodiments of the invention include software programs such as a Java Virtual Machine and/or an operating system that can operate alone or in conjunction with each other with a multiprocessing computerized device to perform the method embodiment steps and operations summarized above and disclosed in detail below. One such embodiment comprises a computer program product that has a non-transitory computer-readable storage medium including computer program logic encoded as instructions thereon that, when performed in a multiprocessing computerized device having a coupling of a memory and a processor, programs the processor to perform the operations disclosed herein as embodiments of the invention to carry out data access requests. Such arrangements of the invention are typically provided as software, code and/or other data (e.g., data structures) arranged or encoded on a computer readable medium such as an optical medium (e.g., CD-ROM), floppy or hard disk or other medium such as firmware or microcode in one or more ROM, RAM or PROM chips, field programmable gate arrays (FPGAs) or as an Application Specific Integrated Circuit (ASIC). The software or firmware or other such configurations can be installed onto the computerized device (e.g., during operating system execution or during environment installation) to cause the computerized device to perform the techniques explained herein as embodiments of the invention.

BRIEF DESCRIPTION OF THE DRAWINGS

The foregoing and other features will be apparent from the following description of particular embodiments disclosed herein, as illustrated in the accompanying drawings in which like reference characters refer to the same parts throughout the different views. The drawings are not necessarily to scale, emphasis instead being placed upon illustrating the principles of the invention.

FIGS. 4A-4E are charts of driving parameter distribution using the distribution model of FIG. 3;

FIGS. 6A, 6B-1, and 6B-2 show Graphical User Interface (GUI) screens rendered by the server of FIGS. 1 and 3.

DETAILED DESCRIPTION

Configurations below depict a system and method for monitoring suspect events indicative of distracted driving. Distracted driving is any activity that could divert a person's attention away from the primary task of driving, particular interactive apps because text messaging, email usage and web browsing require visual, manual, and cognitive attention from the driver, they are by far the most alarming distractions. This problem exists for all types of driver: professional fleet drivers, non-commercial drivers who use a company vehicle for business, drivers of their own private vehicles, inexperienced drivers and teenaged drivers.

A method and system for detecting distracted driving associates distracted driving events to the road type, vehicle speed and vehicle acceleration (positive, negative and lateral) at the time of the distracted driving event, and identifies severe distracted driving events from a large population of minor events using the Cauchy distribution equation, computing driver safety scores which relate time of day, road type, vehicle speed, vehicle acceleration (positive, negative and lateral) and distracted driving using the Cauchy distribution equation, and providing summary and detail reports of driving scores and distracted driving events to concerned parties including insurance companies, fleet managers, vehicle owners and the parents/guardians of teenaged drivers.

Several studies and authorities concur on the gravity of distracted driving. The US Department of Transportation (USDOT) has launched a nationwide campaign to stop distracted driving. Other statistics they sight are:

In 2009, 5,474 people were killed in crashes involving driver distraction, and an estimated 448,000 were injured. (NHTSA).

16% of fatal crashes in 2009 involved reports of distracted driving. (NHTSA)

20% of injury crashes in 2009 involved reports of distracted driving. (NHTSA).

According to at least one source, teen drivers are more likely than other age groups to be involved in a fatal crash where distraction is reported. In 2009, 16% of teen drivers involved in a fatal crash were reported to have been distracted. (NHTSA).

40% of all American teens say they have been in a car when the driver used a cell phone in a way that put people in danger. (Pew)

Drivers who use hand-held devices are 4 times more likely to get into crashes serious enough to injure themselves (Monash University)

Text messaging creates a crash risk 23 times worse than driving while not distracted. (VTTI).

Figure 1:
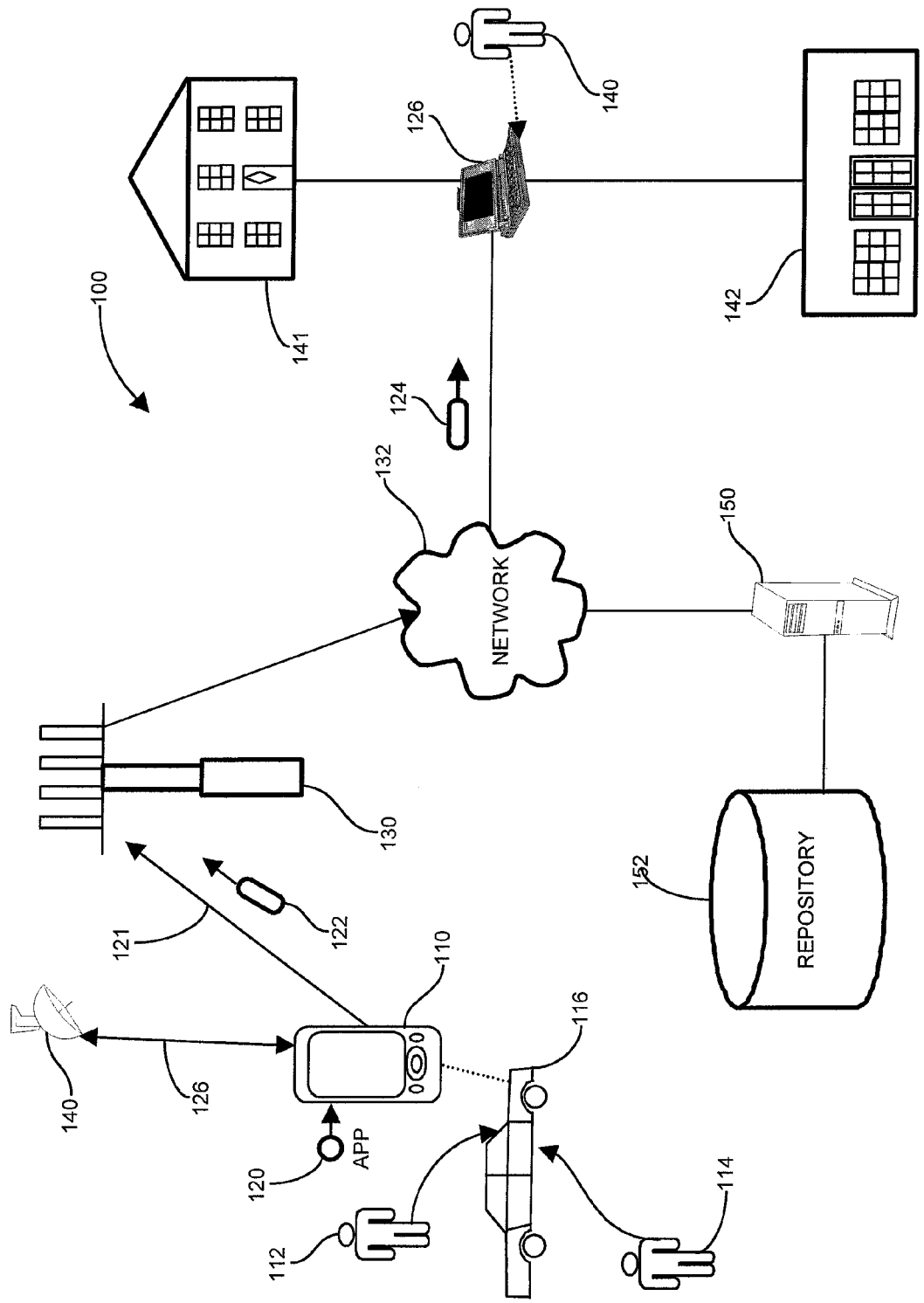
FIG. 1 is a context diagram of a computing environment suitable for use with configurations herein.

FIG. 1 is a context diagram of a computing environment suitable for use with configurations herein. In FIG. 1, a monitored driving environment 100, a driving evaluator application (app) 120 executes on a personal electronic device 110 (personal device) such as a mobile phone or smartphone. The app 120 gathers data and events pertaining to driving performance, and is associated with a driver 112 of a vehicle 116. The driver 112 is distinguished from a passenger 114 of the vehicle through an electronic appliance that recognizes the driver's device 110 (mobile phone), such as a telematics box or other communication medium. A GPS interface 126 access GPS technology 140 for location identification.

Figure 2:
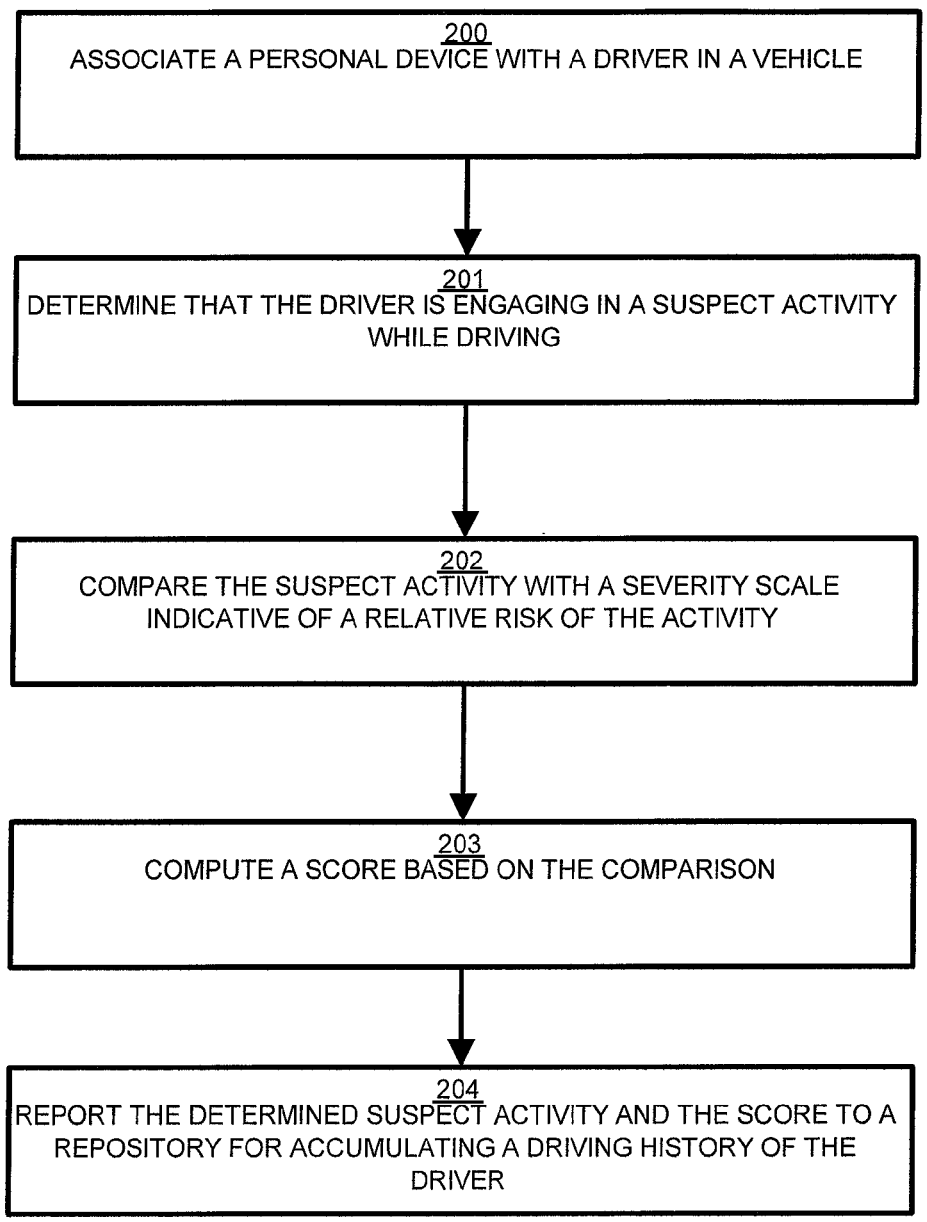
FIG. 2 is a flowchart of a particular configuration in the environment of FIG. 1.

A cellphone antenna 130 or tower receives signals 121 from the personal device 110 for communicating suspect event data to a server 150 via a public access network 132 such as the Internet. Messages 122 containing suspect event data are sent to a server 150. The server 150 stores the event data in a repository 152 for generating a report 124 of driving activity for display on a rendering device 126 such as a laptop, PC or another mobile device. The rendering device 126 allows review of driving performance by a monitoring user 140, such as a parent, supervisor or manager at a home 141 or office 142 location FIG. 2 is a flowchart of a particular configuration in the environment of FIG. 1. Referring to FIGS. 1 and 2, the method for tracking driving habits as disclosed herein includes, at step 200, associating a personal device 110 with a driver 112 in a vehicle 116, and determining that the driver 112 is engaging in a suspect activity while driving, as depicted at step 201. Passenger presence is determined with a vehicle comparison, discussed further below, so that activities of the driver are not erroneously attributed to a passenger also having the app 120. The app 120 invokes the server 150 to compare the suspect activity with a severity scale indicative of a relative risk of the activity, as shown at step 202, and computes a score based on the comparison, as disclosed at step 203. The server 150 then reports the determined suspect activity and the score to the repository 152 for accumulating a driving history of the driver 112, as depicted at step 204.

Figure 3:
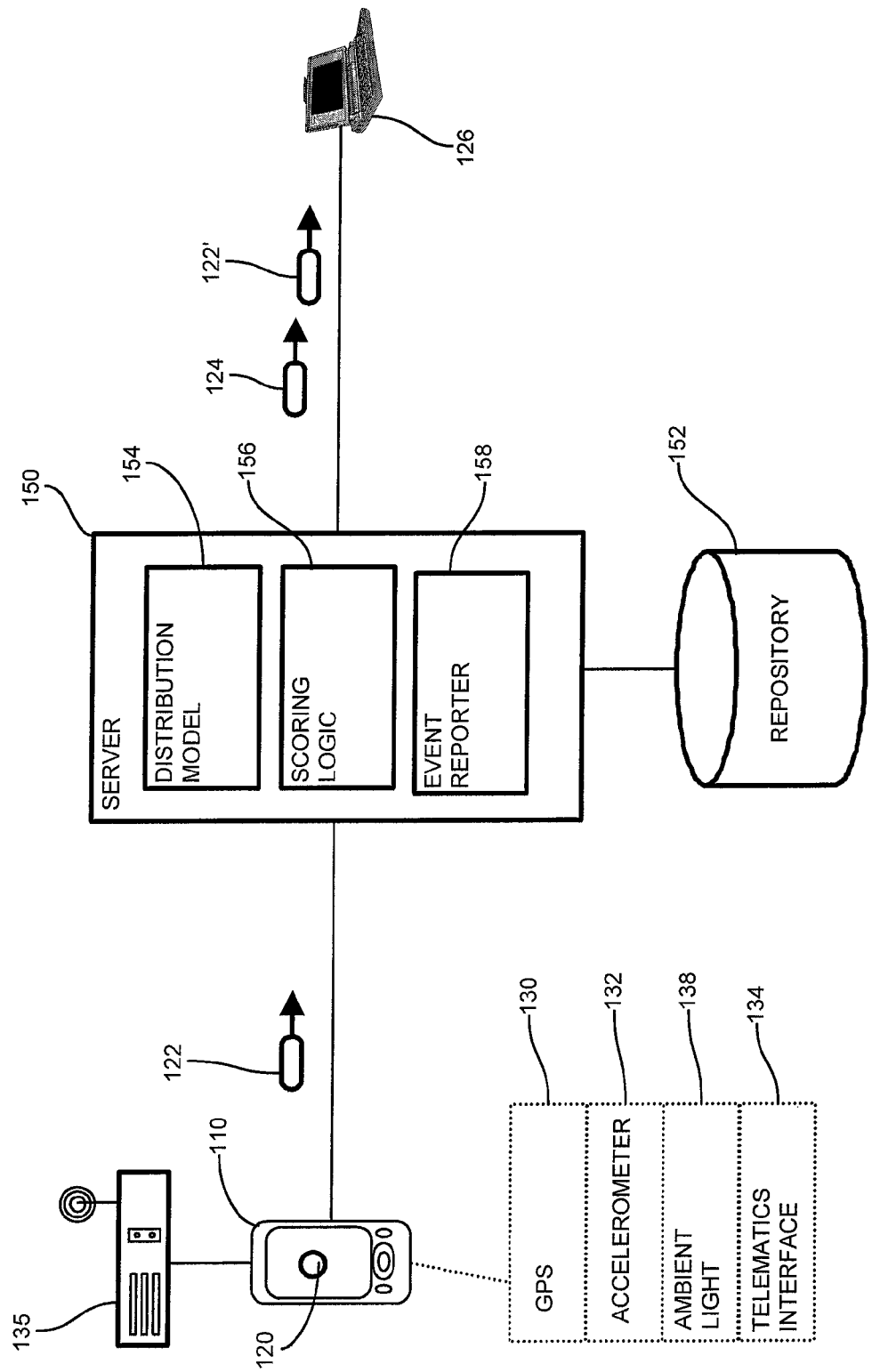
FIG. 3 is a block diagram of a server in the environment of FIG. 1.

FIG. 3 is a block diagram of a server in the environment of FIG. 1. Referring to FIGS. 1 and 3, the application (app) 120 on the personal device 110 identifies suspect activities and sends a message 122 to the server including the data concerning the suspect activity. The personal device 110 includes sensors and components for sensing the data indicative of the suspect activity, such as a GPS (Global Positioning System) interface 130, accelerometer 132, telematics interface 134 and ambient light sensor 136.

The GPS interface 130 employs GPS technology 140 for locating the personal device 110 using latitude and longitude components common to GPS measurements. The accelerometer 132 measures angular velocity for detecting sharp turns and sudden acceleration and braking. The telematics interface 134 provides a link to a telematics appliance 135 for identifying the vehicle, and can also be employed to offload the GPS burden, discussed further below. The ambient light sensor 138 can determine day or night driving conditions, or alternatively the time of day may be employed.

The server 150 includes a distribution model 154, scoring logic 156, and an event reporter 158. The distribution model 154 compares raw event data from a suspect event to previous events of the same driving parameter, such as speed, to determine a statistical ranking of the suspect event. The scoring logic computes a score for the suspect event, and aggregates the scores over time for computing an overall score of a time interval or driving period. The event reporter 158 stores and retrieves the event data, and renders reports 124 of computed scores as well as individual events 122' deemed to warrant a reporting urgency, discussed further below.

Figure 4A:
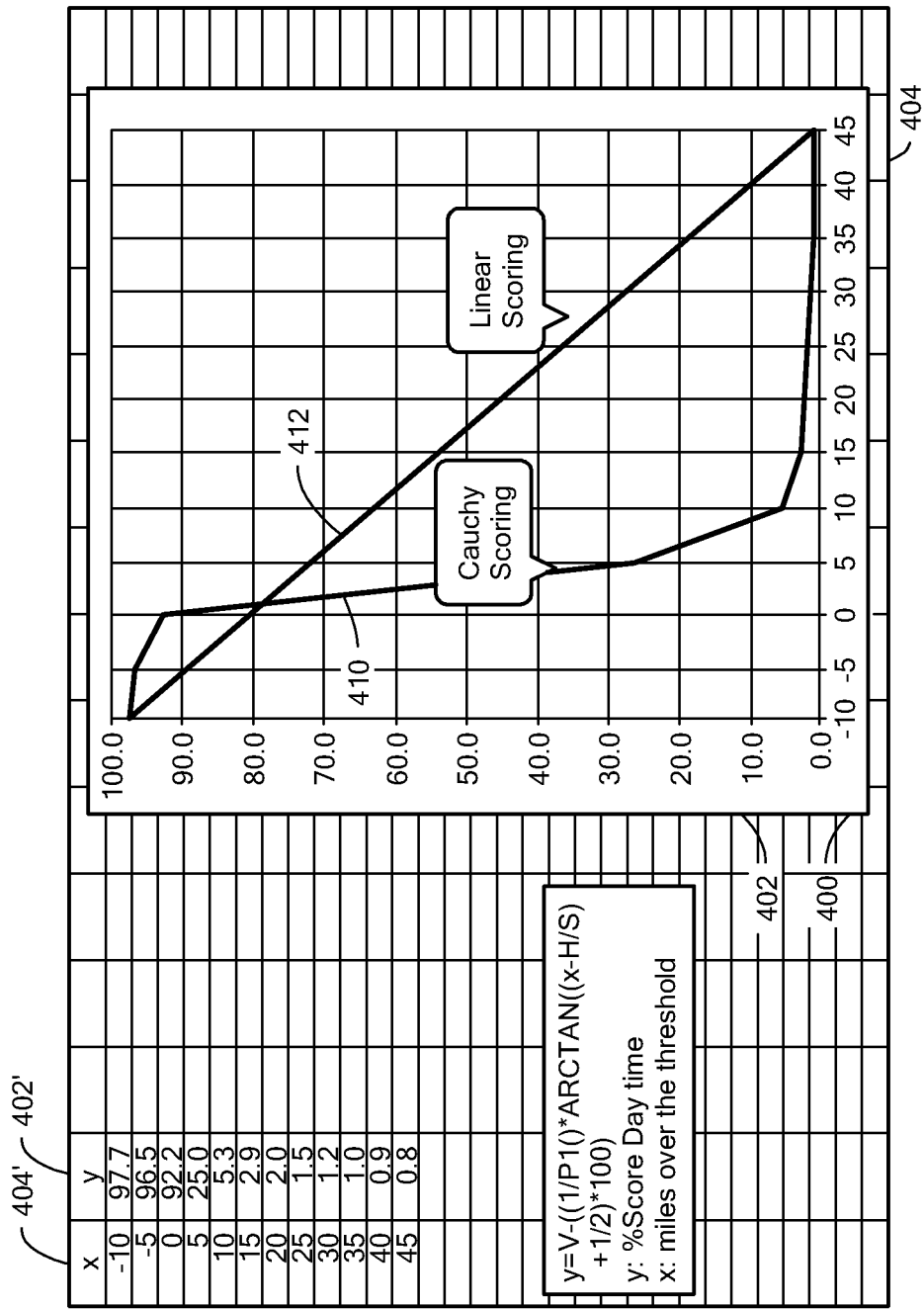
Figure 4B:
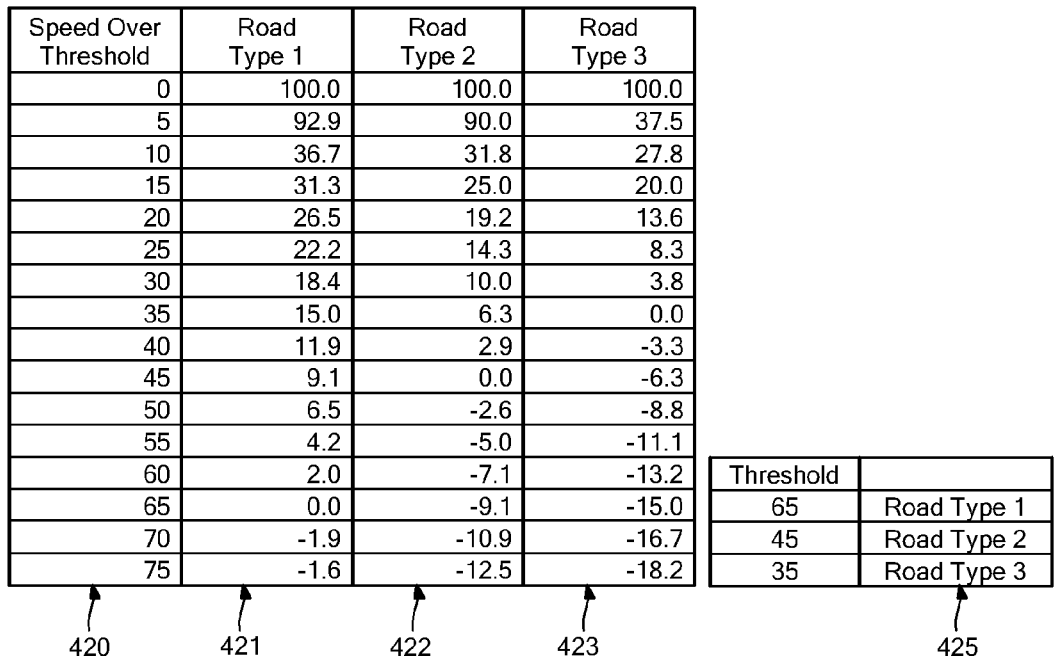
Figure 4C:
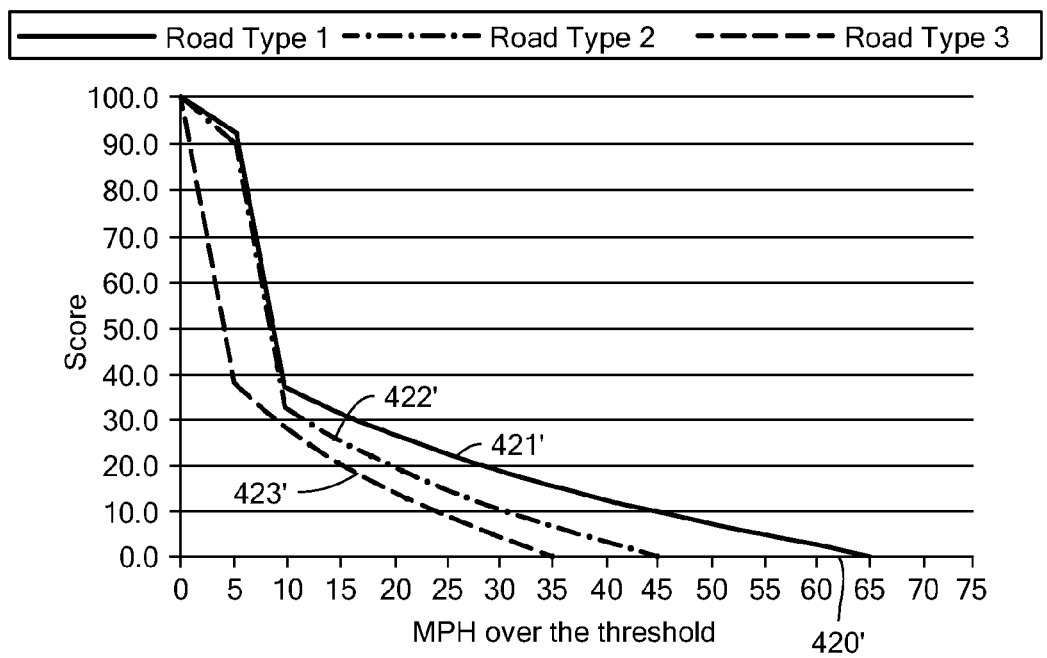

FIGS. 4A-4E show charts of driving parameter distribution using the distribution model 154 of FIG. 3. The distribution model 154 is a statistical model such as a Cauchy distribution, although alternate configurations may employ standard deviation or other model. The model is employed for associating unsafe driving events using a scalar parameter such as excessive speed, harsh acceleration, harsh braking, harsh cornering and distracted driving for comparison with scalar values of other drivers and computing a score indicative of the severity, or deviation from norm, of the suspect event, and may include factors such as the road type, time of day, traffic congestion, weather and other ambient conditions. FIG. 4A shows a graph 400 depicting in general Cauchy scoring model for speed (mph) 410 contrasted with a linear model 412. A horizontal axis 404 indicates mph over a threshold (not necessarily a posted speed limit); thresholds are user/supervisor settable based on road type, with corresponding values 404'. A vertical axis 402 has values 402' and indicates a scoring impact for the speed values. Referring to FIGS. 4B and 4C, a point value per road type is shown to illustrate the effect on scoring for suspect events on different road types. Each of road types 1, 2 and 3 are shown respectively in columns 420, 421, 422 and 423. A road type refers to the general speed and character of the road, such as width, volume and frequency/sharpness of curves, and may be characterized as residential, rural, commercial, and highway, for example. The graph of FIG. 4C shows corresponding curves and axes 420', 421', 422' and 423' for respective columns (values) 420, 421, 422 and 423. A corresponding speed threshold value is also shown in table 425, which refers to the threshold parameter in the Cauchy equation, discussed further below. As can be construed from the chart, road type 3 is likely the most restrictive in character, probably referring to a residential road where excessive speed is strongly deterred, since a mere 5 mph over threshold speed has a score impact from 100 to 37.5. Similarly, road type 1 may be a highway, as the speed overages impact the score only mildly in the first 5 mph over threshold.

Figure 4E:
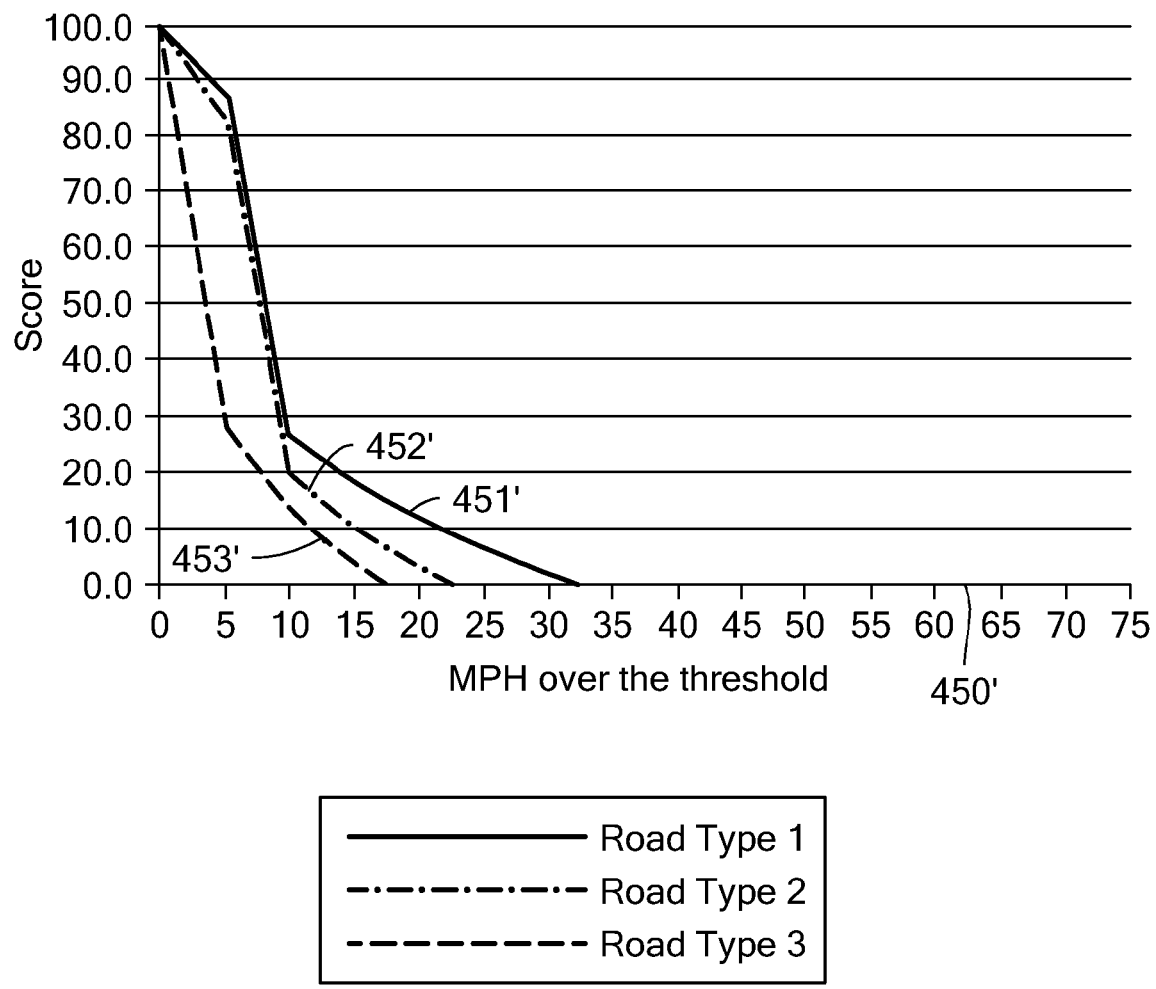

FIGS. 4D and 4E illustrate changes to scoring criteria using the Cauchy model. In FIGS. 4D and 4E, columns 451, 452 and 453 refer respectively to road types 1, 2 and 3, for speed overages 450. In contrast to FIGS. 4B and 4C, however, type 3 roads are even less tolerant to a mere 5 mph overage, reducing the score from 100 to 27.8, due to the different threshold parameters in table 475. Road types 1 and 2 are also more restrictive to the 5 mph overage, at 86.7 and 81.8, respectively. Corresponding graphs 451', 452' and 453' are shown for columns 451, 452 and 453, respectively, against threshold axis 450', reflecting column 450.

The disclosed Cauchy Scoring employs road type, assigned speed and recorded speed. Other parameters could be used. In the current methods in use, billions of points and trips must be sorted to find events that indicate risky driving patterns. This method allows easy and rapid sorting of driving events in low and high risk of crash categories. Additionally, the worst 10% of all drivers can be rapidly identified.

The characteristics of the Cauchy Distribution make it especially useful in identifying marginal and extreme events from a large population of minor events. The Cauchy Distribution modifies a standard bell curve (long tail) to a curve with short tails so that marginal and extreme events can be easily identified.

As each sample is processed, the target parameter is compared to the acceptable threshold setting. Threshold settings can be in MPH or KPH. For example: A speed of 50 mph is compared to threshold of 40 mph for that road type.

An acceleration event of +0.35 g is compared to a threshold of +0.275 g

A braking event of −0.40 g is compared to a threshold of −0.275 g

A cornering event of 0.30 g is compared to a threshold of 0.20 g

A distracted driving event at 30 mph is compared to a threshold of 0 mph.

In the most often used method, a sample is taken and processed once per second while the vehicle is in motion. This method has the beneficial effect of normalizing the driving score over time as each point of a trip is scored independently. The total trip score is the sum of the scores for each point in the trip.

Note that the Cauchy Scoring can be tuned to score distracted driving events very harshly by adjusting the road type threshold setting. As shown in the chart referenced below, the score for a sample point drops quickly as the speed above the threshold increases.

The scoring process follows a Cauchy survival function of the speed of a vehicle over a reference speed. The reference speed can be the road speed limit, the posted speed limit, the average road speed or any other speed threshold used for scoring purposes. The generalized scoring equation is as follows:

$$score(k, r) = 100 * \left( \frac{V}{2} - \frac{\arctan((k - r - H)/S)}{\pi} \right)$$

The variables of the equation are:
k: (measured) speed of the vehicle
r: reference speed
In another embodiment, the input variables can be positive, negative and lateral accelerations measured in g forces, meters per second per second, or feet per second per second. The parameters can be defined as follows:
V: vertical translation of the graph
H: horizontal translation of the graph
S: scale to define the graph slope
Scoring is affected not only by the speed of the vehicle but by some other variables like twilight, weather, age of the driver, type of car, geographic area, etc. So the parameters can be adjusted by conditions not related to speed. As a major effect on the score, besides the speed, the method employs different values of H depending of the time of the day using the nautical twilight. The nautical twilight is calculated using the time and the position of the vehicle to determine if the vehicle is being driven at day or night.
As practical examples, using miles per hour, we found the following good parameter values (i.e. day H=13, night H=8) for scoring:

$$Day\ Score(k, r) = 100 * \left( \frac{1.02}{2} - \frac{\arctan((k - r - 13)/1)}{\pi} \right)$$

$$Night\ Score(k, r) = 100 * \left( \frac{1.02}{2} - \frac{\arctan((k - r - 8)/1)}{\pi} \right)$$

Figure 5A:
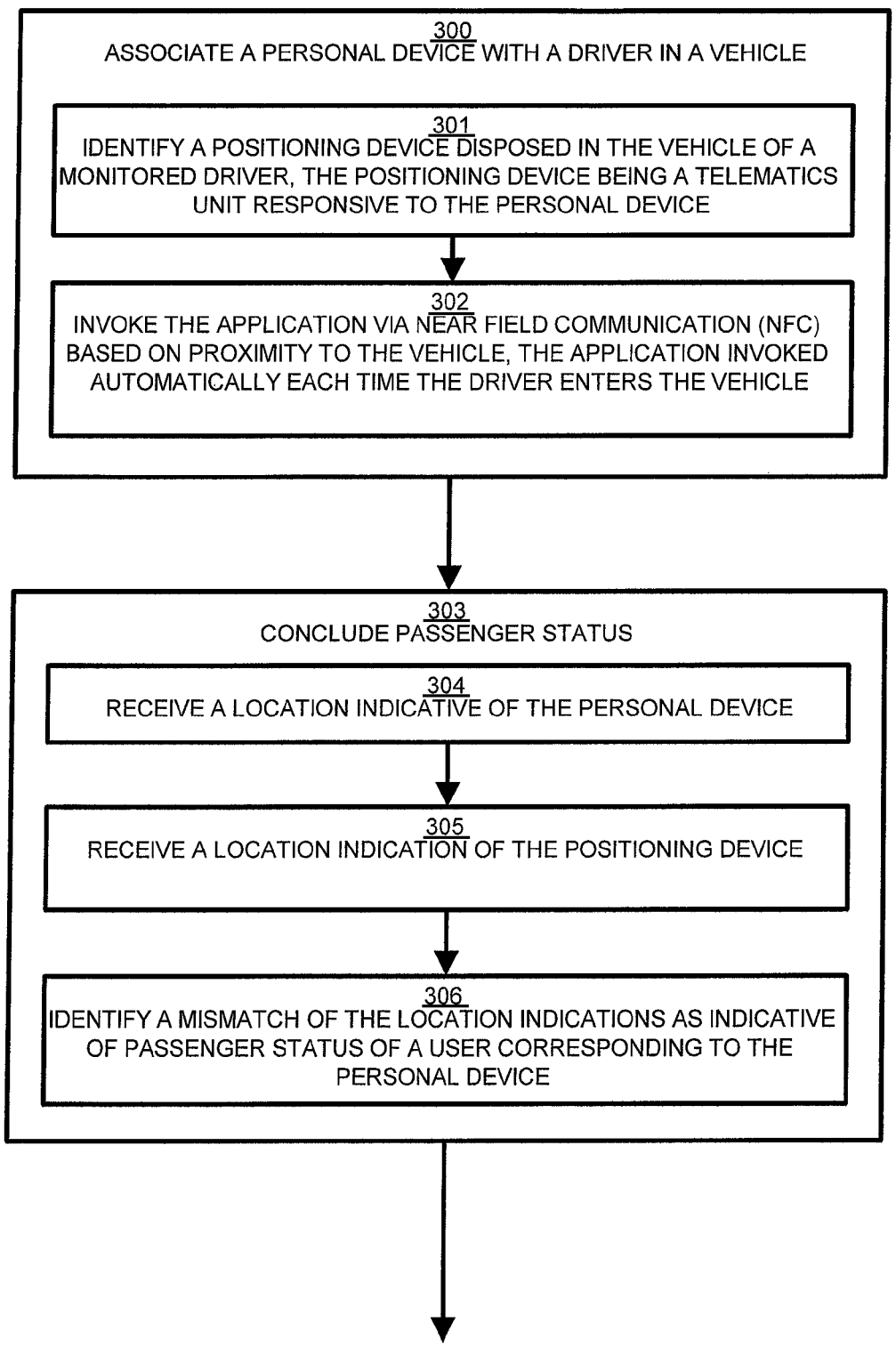
FIGS. 5A-5C are a flowchart of scoring computation in the server of FIG. 3.
Figure 5B:
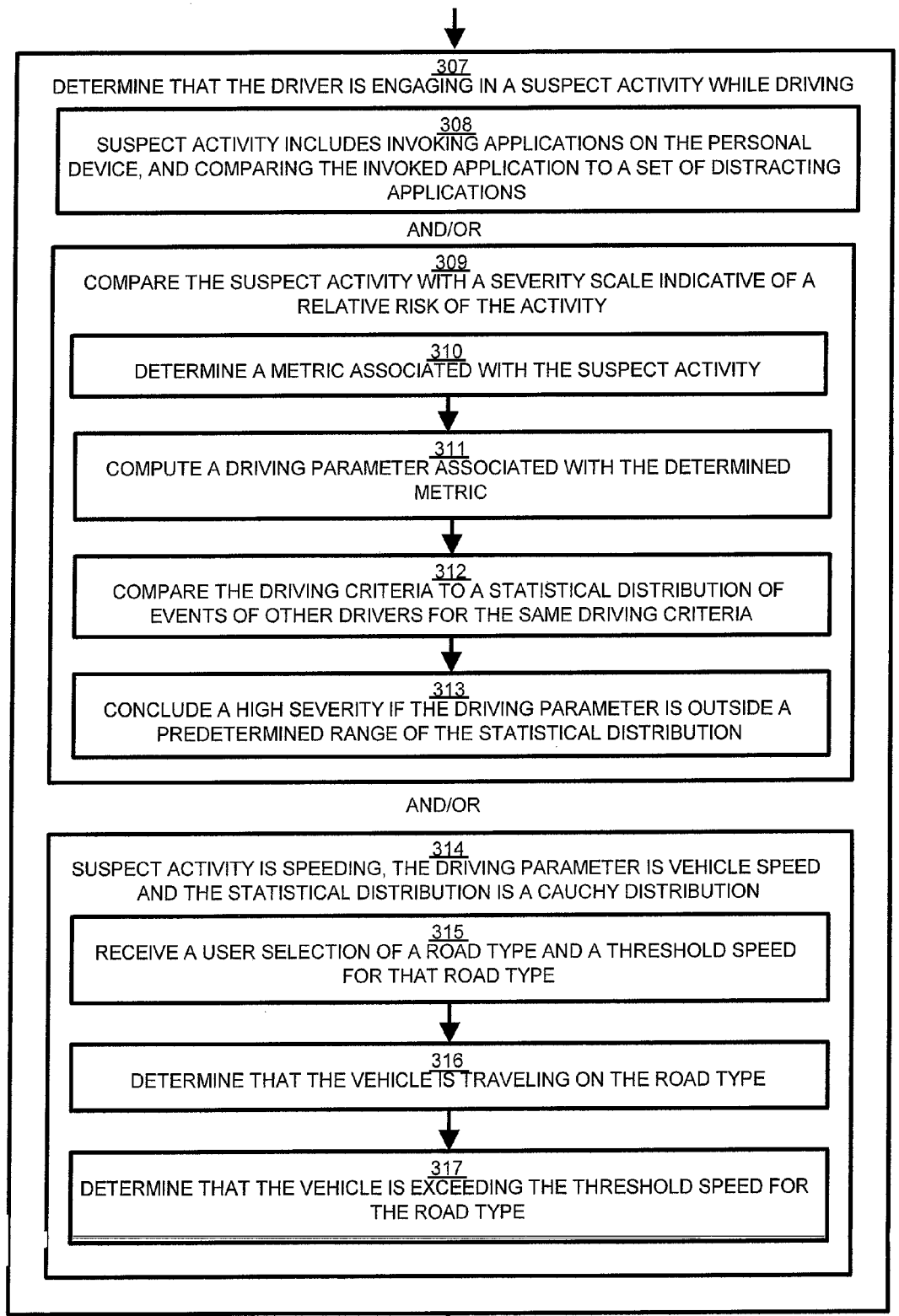
Figure 5C:
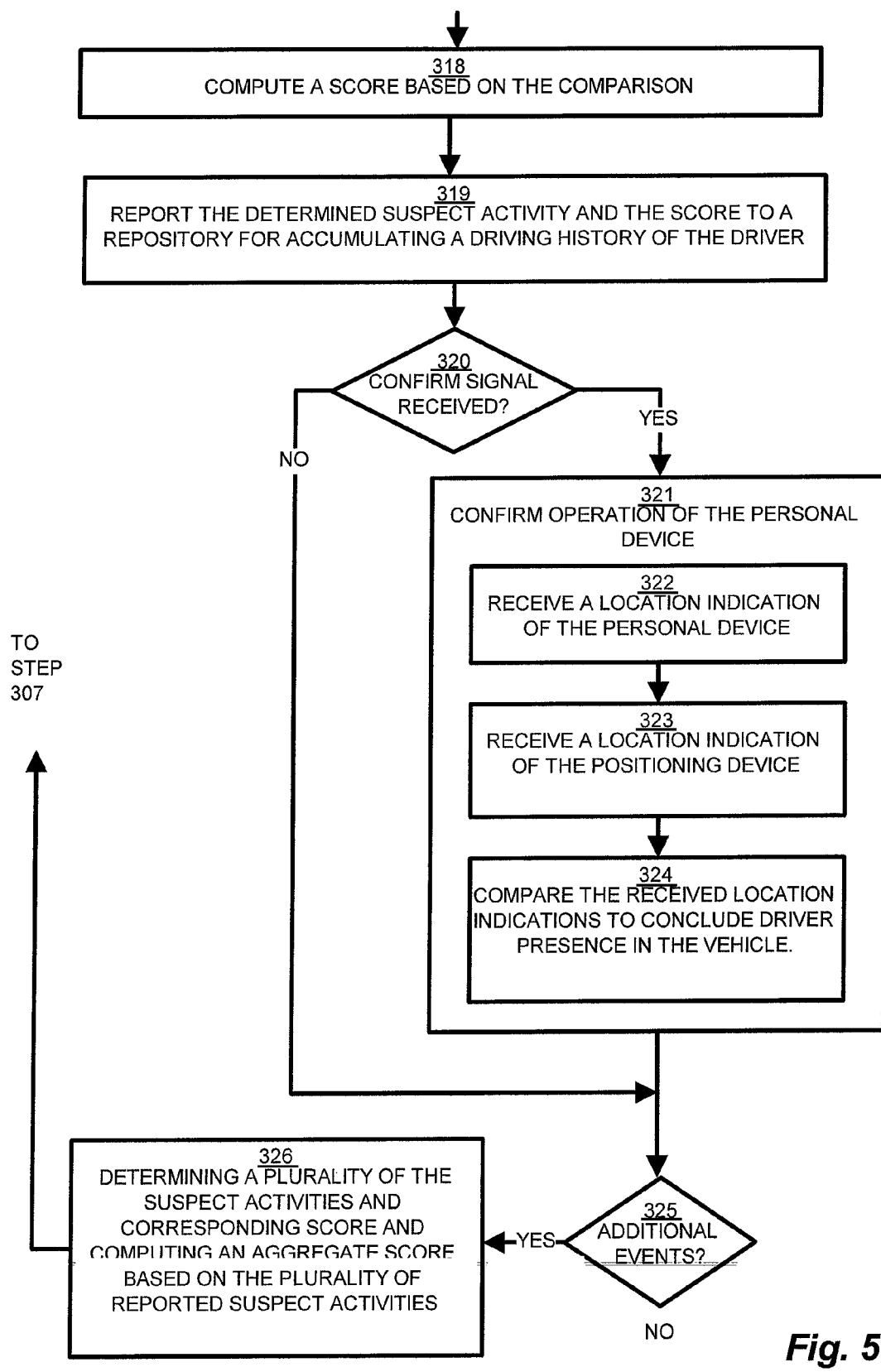
Figure 6A:
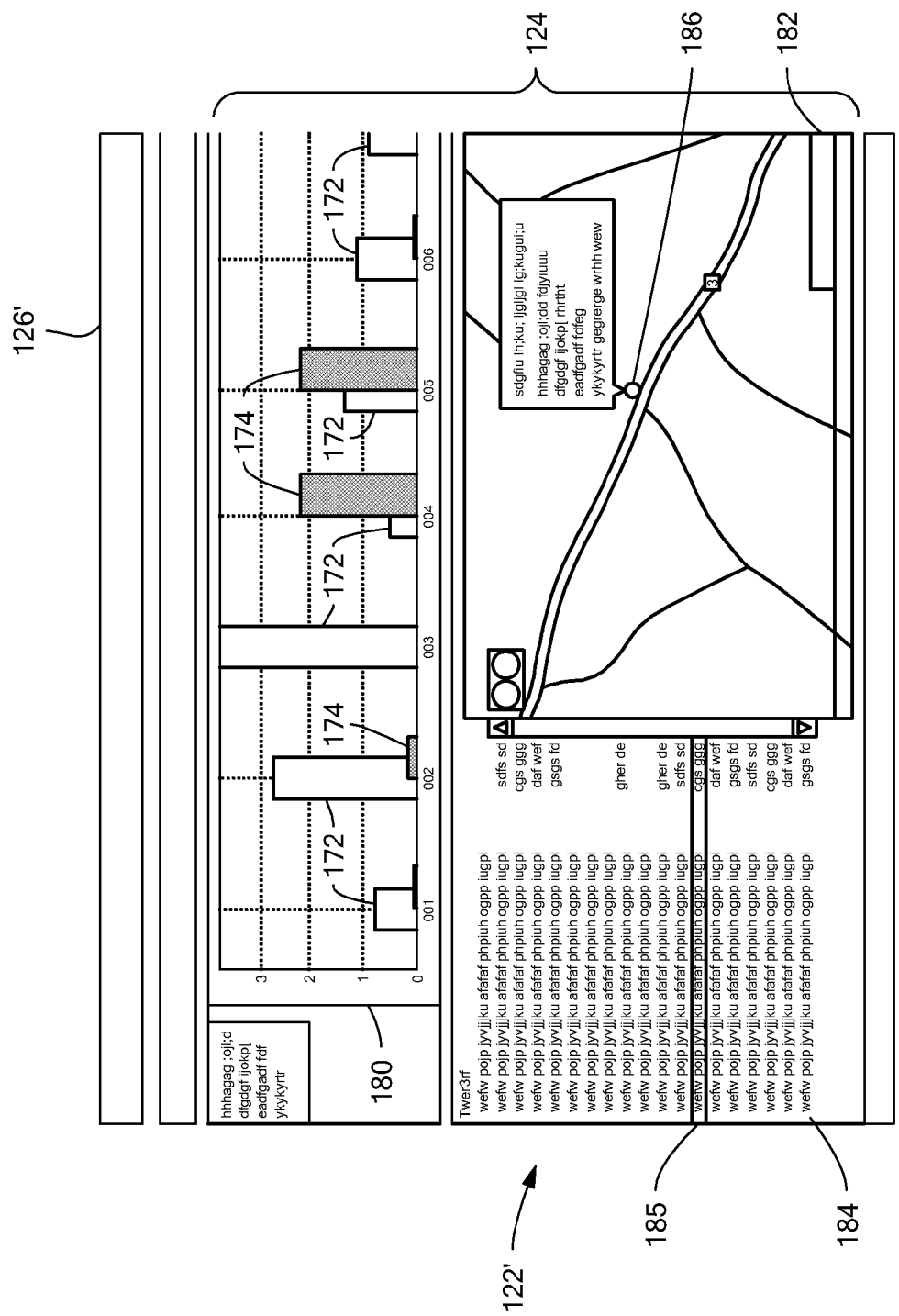

FIGS. 5A-5C are a flowchart of scoring computation in the server of FIG. 3. Referring to FIGS. 3 and 5A-5C, at step 300, the method for tracking driving habits includes associating a personal device with a driver in a vehicle. This may include associating the personal device with the vehicle by identifying a positioning device disposed in the vehicle of a monitored driver, in which the positioning device is a telematics unit (appliance) 135 responsive to the personal device 110, as depicted at step 301. Telematics devices are commonly deployed with vehicles for providing GPS support and communication with an interactive service for emergency or concierge types of response, depending on a desired service level. Application 120 invocation may be facilitated by near field communication (NFC) based on proximity to the vehicle, such that the application is invoked automatically each time the driver enters the vehicle, as depicted at step 302.

In the event a user is not a driver, the server 150 concludes passenger status at step 303 by receiving a location indication of the personal device 110, as depicted at step 304, and receiving a location indication of the positioning device 135, as shown at step 305. The server 150 identifies a mismatch of the location indications as indicative of passenger 114 status of a user corresponding to the personal device 110, as depicted at step 306. Since the vehicle positioning device 135 (telematics box) is not the one associated with the passenger's personal device, the server 150 concludes that the user is a passenger in another driver's car. Alternatively, in the case of a corporation having shift drivers in the same vehicle, a time window is associated with the personal device of each user/employee to indicate which driver is associated with the vehicle at a particular time.

The app 120 determines that the driver is engaging in a suspect activity while driving, as depicted at step 307, and takes one of several actions, depending on the suspect event. At step 308, if the suspect activity includes invoking applications on the personal device 110, the app 110 compares the invoked application to a set of distracting applications, as shown at step 308.

The suspect activity may also include at least one of speeding, sharp turning, sudden acceleration, sudden deceleration, and may be quantified using a metric such as one of speed, angular velocity, linear acceleration. A measured driving parameter could then include speed and angular force measurable on a linear scale to driving parameters of other drivers, as measured by an accelerometer and GPS sensors/messages on the personal device 110.

The personal device 110 compares the suspect activity with a severity scale indicative of a relative risk of the activity, typically via messaging or an exchange with the server 150, as depicted at step 309. This includes determining a metric associated with the suspect activity, such as speed or a sudden change in direction, as depicted at step 310. A driving parameter associated with the determined metric is computed such as miles per hour (mph), angular velocity, or starting/stopping times, as shown at step 311. The driving parameter is intended to be a scalar quantity that can be compared in a statistical manner (such as via a Cauchy distribution) to suspect activities of other drivers. The driving parameter is compared to a statistical distribution of events of other drivers for the same driving parameter, as depicted at step 312, and may be concluded as a high severity if the driving parameter is outside a predetermined range of the statistical distribution, as shown at step 313. Such a high severity may be immediately reported to an authority (monitoring user 140), while more benign suspect events are logged and reported in summary form at a later time.

In the example configuration shown, in the event that the suspect activity is speeding, at step 314, the driving parameter is vehicle speed and the statistical distribution is a Cauchy distribution, as depicted at step 314. In this case, determining the suspect activity includes receiving a user selection of a road type and a threshold speed for that road type, as shown at step 315. The road type, as discussed further below with respect to FIG. 5, generally denotes appropriate speed due to such factors as width, sharp curves, visibility and density (rural, residential, etc.), for example, and is received by the app 120 as an initialization or startup parameter. Other factors may be used. The app 120 determines that the vehicle is traveling on a particular road type, due to GPS determined location and a road classification database indicative of the road type, as shown at step 316. The app 120 may determine that the vehicle is exceeding the user (supervisor) defined threshold speed for the road type, which is independent from and may be greater or less than the posted legal speed limit for the road, as shown at step 317.

The road type may be determined by any suitable manner, such as the road classification database discussed above, or other manner such as the speed monitoring determination disclosed in the US patent application cited above. The road classification is distinguished from a posted speed limit because road classification is defined by a different authority and is not necessarily determinable from the speed limit.

GPS engine providers typically have their own road classification layer which provides a homogenous road classification system world wide, so a class 2 road in the US would have the same speed profile as a class 2 road in other countries. Other sources of road type include the US Census Bureau Tiger Road Classification System.

In contrast, a posted speed limit is determined by local law enforcement, and often changes over the same road type. For example, speed limits often vary when approaching a major intersection, while the general road type would remain the same. The road type may be one of rural, suburban, highway, city, commercial, residential and private, to name several. Other labels may be applied. The road type denotes a structure and character to a road, which is a factor in a level of attentiveness and speed required for maintaining safe driving. A narrow, windy rural road requires more attention of the driver and lower speed to accommodate common and sharp turns which may come up suddenly. A commercial street may be wide and straight, allowing a higher speed but having more congestion and vehicles likely to stop suddenly for deliveries. A residential street commands a lower speed due to the risk of pedestrians. A highway has predictable curves and long visibility, and may be appropriate for higher speed and be more tolerant of a lessened driver attention. Published road classifications identifying such road types are obtainable.

For each of the suspect events discussed above, using the gathered information, a score is computed based on the comparison (statistical model of other suspect events), as depicted at step 318, and the determined suspect activity and the score reported to the repository 152 for accumulating a driving history of the driver, as disclosed at step 319.

From time to time during app execution, or at the bequest of the user/supervisor 140, a conformation request signal may be sent from the server to the app to confirm that the app is actively monitoring driving so that the driver cannot avoid scrutiny by disabling or exiting the app or phone. At step 320, if a signal was received, then the server 150 proceeds to confirm operation of the personal device at step 321 by receiving a location indication of the personal device, as depicted at step 322, and receives a location indication of the positioning device, as shown at step 323. The server 150 then compares the received location indications to conclude driver presence in the vehicle and operation of the app 120 for monitoring driving, as shown at step 324.

Generally, a series of suspect events are gathered during an operating session or interval, and an aggregate score computed. Accordingly, at step 325, a check is performed to identify if additional suspect events are being gathered, and accordingly the server 150 and app 120 collectively determine a plurality of the suspect activities and corresponding score and compute an aggregate score based on the plurality of reported suspect activities, and control reverts to step 307 to monitor and gather the next suspect event, as shown at step 326.

FIGS. 6A, 6B-1, and 6B-2 show Graphical User Interface (GUI) screens rendered by the server of FIGS. 1 and 3. Referring to FIGS. 1, 3, a rendering screen 126' on the rendering device 126 presents the report 124 of a monitored driver 112 for viewing by the monitoring user 140 (parent, employer, etc.). Individual suspect events 122' are shown in an event window 184, and selection (highlighted event 185) displays an event location icon 186 in a map display window 182 to identify the location at which the suspect event 122' occurred. Statistical graphs of different event types (speed over threshold, hard stop, application use, etc.) are shown in statistics window 180, and show an individual driver graph 174 next to a general distribution graph 172 based on the driving population at large (or for a specific suspect such as age, geography, etc.) as stored in the repository 152.

FIG. 6B shows a rendering of all events 122' for a specific driver, sorted by category (driving, system, summary, etc.). An event label column 190 shows the specific event name, and whether it was posted on the portal (column 192) or sent directly to contacts (monitoring user 140) in column 194 for events having a significant severity or immediate need for redress. The description column 196 clarifies the nature of the event indicated in the label column 190.

Those skilled in the art should readily appreciate that the programs and methods defined herein are deliverable to a computer processing and rendering device in many forms, including but not limited to a) information permanently stored on non-writeable storage media such as ROM devices, b) information alterably stored on writeable non-transitory storage media such as floppy disks, magnetic tapes, CDs, RAM devices, and other magnetic and optical media, or c) information conveyed to a computer through communication media, as in an electronic network such as the Internet or telephone modem lines. The operations and methods may be implemented in a software executable object or as a set of encoded instructions for execution by a processor responsive to the instructions. Alternatively, the operations and methods disclosed herein may be embodied in whole or in part using hardware components, such as Application Specific Integrated Circuits (ASICs), Field Programmable Gate Arrays (FPGAs), state machines, controllers or other hardware components or devices, or a combination of hardware, software, and firmware components.

While the system and methods defined herein have been particularly shown and described with references to embodiments thereof, it will be understood by those skilled in the art that various changes in form and details may be made therein without departing from the scope of the invention encompassed by the appended claims.

What is claimed is:

1. A method for tracking driving habits, comprising:
   receiving an indication of an association of a personal device with a driver in a vehicle, the personal device being a telecommunications and computing device associated with a driver of the vehicle;
   determining that the driver is engaging in a suspect activity while driving;
   comparing the suspect activity with a severity scale indicative of a relative risk of the activity, comparing further comprising:
   determining a metric associated with the suspect activity;
   computing a first driving parameter associated with the determined metric;
   comparing the driving parameter to a statistical distribution, including a Cauchy distribution translated by a second driving parameter, of events of other drivers for the first driving parameter, the first driving parameter being a scalar quantity pertaining to vehicle motion and the second driving parameter based on ambient conditions; and
   concluding a high severity if the driving parameter is outside a predetermined range of the Cauchy distribution;
   computing a score based on the comparison; and
   reporting the determined suspect activity and the score to a repository for accumulating a renderable driving history of the driver indicative of distracted driving events.

2. The method of claim 1 further comprising determining a plurality of the suspect activities and corresponding score and computing an aggregate score based on the plurality of reported suspect activities.

3. The method of claim 1 wherein the suspect activity is excessive speed, the driving parameter is vehicle speed.

4. The method of claim 1 wherein the suspect activity includes invoking applications on the personal device, and comparing the invoked application to a set of distracting applications.

5. The method of claim 1 wherein determining the suspect activity includes:
receiving a user selection of a road type and a threshold speed for that road type;
determining that the vehicle is traveling on the road type by reference to a GPS location and external road classification database; and
determining that the vehicle is exceeding the threshold speed for the road type.

6. The method of claim 1 further comprising associating the personal device with the vehicle by:
identifying a positioning device disposed in the vehicle of a monitored driver, the positioning device being a telematics unit responsive to the personal device.

7. The method of claim 1 wherein the suspect activity includes at least one of speeding, sharp turning, sudden acceleration, sudden deceleration, the metric includes one of speed, angular velocity, linear acceleration, and the driving parameter includes speed and angular force measurable on a linear scale to driving parameters of other drivers.

8. The method of claim 1 further comprising confirming operation of the personal device by:
receiving a location indication of the personal device;
receiving a location indication of the positioning device;
comparing the received location indications to conclude driver presence in the vehicle.

9. The method of claim 8 further comprising concluding passenger status by
receiving a location indication of the personal device
receiving a location indication of the positioning device;
identifying a mismatch of the location indications as indicative of passenger status of a user corresponding to the personal device.

10. The method of claim 1 further comprising invoking the association of the personal device via near field communication (NFC) based on proximity to the vehicle, the application invoked automatically each time the driver enters the vehicle.

11. The method of claim 3 wherein determining a speed further comprises receiving a plurality of GPS signals over a time interval, the GPS signals received via a telematics appliance in the vehicle, such that a native GPS receiver on the personal device imposes no battery drain.

12. The method of claim 1 further comprising
receiving a driving parameter from the associated device, the driving parameter indicative of the suspect activity;
determining, based on the received driving parameter, a metric adapted to rank the suspect activity associated with the driving parameter; and
comparing the computed score to scores computed for other drivers.

13. The method of claim 1 further comprising ranking the score based on the scores of other drivers using a Cauchy distribution.

14. The method of claim 1 further comprising
receiving a first stream of distracted driving parameters from the device
identifying a second stream of server side inputs, and
invoking a Cauchy distribution for analyzing the first and second input streams.

15. The method of claim 1 wherein computing further comprises invoking a Cauchy distribution for identifying a relative risk presented by the computed score based on scores computed for other drivers.

16. The method of claim 1 wherein the Cauchy distribution is based on a nautical twilight indicative of whether the vehicle is being driven at day or night.

17. A method for tracking driving events, comprising:
determining, via a personal device associated with a driver in a vehicle, a speed of the vehicle based on a computed positioning of the personal device;
receiving a user defined speed threshold corresponding to a road type determined from the position of the vehicle, the threshold defined for the road type, the personal device being a telecommunications and computing device associated with a driver of the vehicle;
receiving a location indication of the personal device;
receiving a location indication of a positioning device;
comparing the received location indications to conclude driver presence in the vehicle; and
comparing a first driving parameter indicative of the speed to the received threshold and reporting the determined speed and the road type if the determined speed exceeds the threshold corresponding to the road type currently being traveled for rendering a driving history of the driver indicative of distracted driving events, comparing further comprising:
comparing the driving parameter to a statistical distribution, including a Cauchy distribution translated by a second driving parameter, of events of other drivers for the first driving parameter, the first driving parameter being a scalar quantity pertaining to vehicle motion and the second driving parameter based on ambient conditions including the road type;
concluding a high severity if the driving parameter is outside a predetermined range of the Cauchy distribution;
computing a score based on the comparison; and
reporting the determined suspect activity and the score to a repository for accumulating a renderable driving history of the driver indicative of distracted driving events.

18. The method of claim 17 wherein determining the position further comprises receiving a positioning signal from a telematics appliance in the vehicle, the telematics appliance receiving the positioning signal from a remote source, receiving the positioning signal from the telematics appliance consuming less energy than receiving the positioning signal from the remote source.

19. The method of claim 17 further comprising:
receiving a user selection of a road type and a threshold speed for that road type;
determining that the vehicle is traveling on the road type; and
determining that the vehicle is exceeding the threshold speed for the road type.

20. The method of claim 17 wherein the driving parameters include speed, location, time of day, accelerometer g-force, fuel usage, device app usage, and device keystrokes.

* * * * *